(12) United States Patent
Giglio et al.

(10) Patent No.: US 11,747,575 B2
(45) Date of Patent: Sep. 5, 2023

(54) OPTICAL FIBER CONNECTOR AND RELATED METHOD

(71) Applicant: PRYSMIAN S.p.A., Milan (IT)

(72) Inventors: Antonio Giglio, Ho Chi Minh (VN); Kris Roberts, Eastleigh (GB); Luca Cavenaghi, Milan (IT); Ian James Griffiths, Eastleigh (GB)

(73) Assignee: PRYSMIAN S.p.A., Milan (IT)

( * ) Notice: Subject to any disclaimer, the term of this patent is extended or adjusted under 35 U.S.C. 154(b) by 0 days.

(21) Appl. No.: 17/491,340

(22) Filed: Sep. 30, 2021

(65) Prior Publication Data

US 2022/0107466 A1 Apr. 7, 2022

(30) Foreign Application Priority Data

Oct. 2, 2020 (IT) .................. 102020000023317

(51) Int. Cl.
*G02B 6/38* (2006.01)

(52) U.S. Cl.
CPC ........... *G02B 6/387* (2013.01); *G02B 6/3825* (2013.01); *G02B 6/3831* (2013.01); *G02B 6/3849* (2013.01)

(58) Field of Classification Search
CPC .......................... G02B 6/3825; G02B 6/3831
See application file for complete search history.

(56) References Cited

U.S. PATENT DOCUMENTS

| | | | |
|---|---|---|---|
| 8,770,863 | B2 | 7/2014 | Cooke et al. |
| 9,939,589 | B2 | 4/2018 | Takano et al. |
| 10,209,457 | B2 | 2/2019 | Watanabe |
| 10,627,581 | B2 | 4/2020 | Hsu et al. |
| 2018/0364421 | A1* | 12/2018 | Chang .................. G02B 6/3882 |
| 2019/0121032 | A1 | 4/2019 | Childers et al. |
| 2019/0137700 | A1 | 5/2019 | Takano et al. |
| 2019/0227240 | A1* | 7/2019 | Hsu ...................... G02B 6/3825 |

(Continued)

FOREIGN PATENT DOCUMENTS

CN 214540140 U * 10/2021

*Primary Examiner* — Eric Wong
(74) *Attorney, Agent, or Firm* — Seed IP Law Group LLP (57) ABSTRACT

The invention relates to an optical fiber connector and to a related method for changing the polarity thereof. The connector comprises a ferrule, housing a plurality of terminations of optical fibers, and an inner housing arranged around the ferrule and comprising a rear portion and a front portion configured to be inserted into an optical fiber adapter. The front portion is releasably connected to the rear portion and comprises a frame, configured to surround an outer surface of the ferrule, and a key, extending from said frame along a longitudinal direction of the connector and configured to mate with a corresponding keyway provided in the optical fiber adapter, and The front portion is releasably connected to the rear portion by means of a first coupling member associated to the front portion cooperating with a second coupling member associated to the rear portion, in either one of a first orientation, in which the key extends along an upper wall of the inner housing, said first orientation corresponding to a first polarity of the connector with respect to the adapter, and a second orientation, in which the key extends along a lower wall of the inner housing, said second orientation corresponding to a second polarity of the connector with respect to the adapter.

20 Claims, 5 Drawing Sheets

(56) References Cited

U.S. PATENT DOCUMENTS

2021/0263235 A1* 8/2021 Kuffel .................. G02B 6/3882
2021/0263238 A1* 8/2021 Tseng .................. G02B 6/3869
2021/0373254 A1* 12/2021 Wong .................. G02B 6/3878

* cited by examiner

OPTICAL FIBER CONNECTOR AND RELATED METHOD

BACKGROUND

Technical Field

The disclosure relates to an optical fiber connector and to a related method for changing the polarity thereof.

Description of the Related Art

Optical fiber communication systems employ a network of fiber optic cables to transmit large volumes of data and voice signals over relatively long distances. As a result, fiber optic communications systems include a number of nodes at which multiple optical fibers are interconnected.

The connection between optical fibers is usually carried out by means of an optical connector. Typically, the optical fiber connector is a mechanical component for aligning and connecting the optical fibers together. The optical fiber may be part of an optical cable or device (such as an optical or optoelectronic device).

Optical fiber connectors generally include a housing portion that contains a ferrule, provided for retaining the terminations of the optical fibers.

The housing structure of the optical fiber connector is typically configured to interact with a corresponding adapter. An adapter, in a simple form, may include one or more aligned ports each configured for receiving an optical fiber connector therein.

Multi-fiber optical cables are terminated by corresponding multi-fiber optical connectors. For example, Multi-fiber Push On (MPO) connectors may contain and connect 12 up to 24 optical fibers.

As is known, especially when multi-fiber optical cables and connectors are involved, it is important to ensure that the optical fibers are connected according to the correct polarity, in other words that a proper continuity is maintained between transmitter and receivers according to the flow direction of the light signal through the optical fibers.

To ensure that the connector and the corresponding adapter are properly matched, it is known in the art to provide the connector and the adapter with a mating feature, also defined "key," that allows the connector to match the adapter in a single mating configuration, corresponding to the correct polarity of the interconnected optical fibers.

However, if on the one side the provision of a mating feature advantageously prevents the connection of cables according to a mistaken polarity, on the other side it also precludes to easily reverse the polarity, if needed for any reason, without disassembling completely the interconnected cables.

In order to solve this issue, different solutions of connectors with changeable polarity have been investigated in the field.

For example, U.S. Pat. No. 9,939,589B2 discloses optical fiber connectors configured to allow ease of change of the connector polarity by providing a lockable outer housing.

The document describes an optical fiber connector including an inner housing, at least one key configured to move along the inner housing so as to change a polarity of said optical fiber connector, and an outer housing disposed around at least a portion of the inner housing and configured to slide in a longitudinal direction so as to expose at least a portion of said at least one key. The outer housing includes a flexible portion configured to lock to the inner housing so as to retain the outer housing in a pulled back position relative to the inner housing. In order to change the polarity of the connector, the keys are removable and may be positioned at alternate locations on the housing of the connector.

In embodiments in which one key is provided, when the key is disposed on a top wall of the housing, the connector is configured to define a first keyed configuration for insertion of the connector into an adapter in only a first orientation, so as to define a first polarity with respect to the adapter. Alternatively, when the key is disposed on a bottom wall of the housing, the connector is configured to define a second keyed configuration for insertion of the connector into the adapter in only a second orientation to define a second polarity with respect to the adapter.

In other embodiments in which two keys are provided, disposed at opposite sides of the housing of the connector, one of the first and second keys may be in its first position and the other of the first and second keys may be in its second position to provide a first polarity for the fiber optic connector. In order to provide a second opposite polarity for the connector, the first key is slidingly displaced from its corresponding first or second position to the other of the first and second positions, and the second key is slidingly displaced from its corresponding first or second position to the other of the first and second positions.

Another example of optical fiber connector, wherein the connector includes a plug body, a rear sleeve unit and a front sleeve unit, is disclosed in U.S. Pat. No. 10,627,581B2. The plug body has first and second recesses. The rear sleeve unit is detachably sleeved around a rear part of the plug body, and has a key. The front sleeve unit is sleeved on the plug body in front of the rear sleeve unit and detachably connected to the rear sleeve unit. The rear sleeve unit is changeable between a first position, in which the rear sleeve unit is attached to the plug body with the key being engaged with the first recess, and a second position in which the rear sleeve unit is attached to the plug body with the key being engaged with the second recess.

This document does not address the problem of obtaining an effective polarity changeable connector, rather it seems mainly concerned with providing a connector with separate components that can be designed and manufactured separately, so as to allow each component and the overall connector to be miniaturized.

Another exemplary optical fiber connector, configured to include a switchable polarity key that can be used to define first and second polarity configurations for the connector, is described in U.S. Pat. No. 8,770,863B2. The connector has a multi-fiber ferrule surrounded by an inner housing. The inner housing has top and bottom recesses sized to accommodate the polarity key. The polarity key is removably secured in either a top or bottom recess using a latching feature. The polarity of the connector can be switched by moving the polarity key from one position in the connector to the other rather than having to disassemble the connector.

The polarity key includes a securing feature, in the form of a slot, configured to be engaged by corresponding latching features of the housing. The latching feature includes a catch that extends downwardly from an elastic elongate release member, the catch being configured to fit the slot provided on the polarity key.

US2018364421A1 discloses a fiber optic connector that is switchable between male and female plug configurations. The fiber optic connector includes in particular a housing body, a sleeve and a conversion unit configured for changing between the male and the female configurations.

The conversion unit includes a clamping member disposed in the housing body and having two clamping portions, two guide pins and two connection keys. The connection keys are slidable relative to the sleeve in the respective sliding grooves, between a concealed position, in which the connection keys are concealed by the sleeve, and a non-concealed position, in which the connection keys are exposed from the sleeve. When one of the connection keys slides to the non-concealed position to match with a corresponding key slot of the adaptor, the connector can be connected to the adaptor.

BRIEF SUMMARY

The Applicant has observed that in polarity-changeable connectors, the one or more mating features, such as the keys described in the above documents, should be removed from and re-inserted in the corresponding seats provided in the housing of the connector as easily as possible.

For example, the Applicant has observed that the provision of small detachable keys configured to fit into equally small-sized recesses on the housing of the connector, such as the keys in the form of elongate thin tabs disclosed in the above documents, may be quite difficult to be handled manually, and may result in a complicated polarity-inversion procedure.

Furthermore, the Applicant has observed that when the polarity-changeability is obtained by means of the combined displacement of two or more keys, as in the case of documents U.S. Pat. No. 9,939,589B2 and US2018364421A1, all the keys must be placed in the respective right seat to achieve the correct mating configuration that allows the connector to fit into the adapter. In other words, a mistaken position of one key with respect to the other(s) may disadvantageously result in a non-working configuration of the connector, in which the latter does not to fit into the corresponding adapter due to misalignment of one or more of the keys with respect to the corresponding seats on the adapter.

The Applicant has also observed that the connector described in U.S. Pat. No. 10,627,581B2 has a key carried by a rear sleeve unit, which is detachably mounted to a rear part of the plug body, with respect to a front part thereof configured to be inserted in the adapter. Due to this configuration, the procedure for removing, turning and reinserting the rear sleeve unit carrying the key, thereby inverting the polarity of the connector, is complex and requires the rear sleeve unit to be disassembled from both the plug body and the optical fiber cable. In addition, the use of a specific tool is needed to carry out this operation.

The Applicant has thus tackled the problem of providing a connector for optical cables that allows to change the polarity of the interconnected optical cables through a simple and quick procedure, requiring the displacement of easy-to-handle components.

Consistently, in a first aspect the present invention relates to an optical fiber connector, comprising:
- a ferrule, housing a plurality of terminations of optical fibers, and
- an inner housing arranged around the ferrule and comprising a rear portion and a front portion configured to be inserted into an optical fiber adapter,
  wherein the front portion of the inner housing is releasably connected to the rear portion of the inner housing and comprises a frame, configured to surround an outer surface of the ferrule, and a key extending from said frame along a longitudinal direction of the connector, said key being configured to mate with a corresponding keyway provided in the optical fiber adapter, and
  wherein the front portion of the inner housing is releasably connected to the rear portion of the inner housing by means of a first coupling member associated to the front portion of the inner housing cooperating with a second coupling member associated to the rear portion of the inner housing, in either one of:
  - a first orientation in which the key extends along an upper wall of the inner housing, said first orientation corresponding to a first polarity of the connector with respect to the adapter, and
  - a second orientation in which the key extends along a lower wall of the inner housing, said second orientation corresponding to a second polarity of the connector with respect to the adapter.

The Applicant has found that the connector of the invention advantageously allows the polarity change procedure to be carried out in a particularly simple manner, by simply acting on a single component of the connector, namely the detachable front portion of the inner housing of the connector, which supports the key. Said front portion thus effectively plays the role of a polarity change component of the connector.

In addition, since said front portion is located in a front region of the connector, facing the corresponding adapter, it can be easily accessed without requiring any further part of the connector to be dismounted from the related cable.

Moreover, the front portion of the connector of the invention is not only easy to access but also particularly easy to handle during the polarity change procedure, as the front portion of the inner housing, carrying the key, can be displaced by holding the key-supporting frame thereof, which is easier to grab with respect to the key alone.

According to a second aspect, the invention relates to a method for changing the polarity of an optical fiber connector, wherein said connector comprises a ferrule, housing a plurality of terminations of optical fibers, and an inner housing arranged around the ferrule and comprising a rear portion and a front portion configured to be inserted into an optical fiber adapter,
  wherein the front portion of the inner housing is releasably connected to the rear portion of the inner housing and comprises a frame configured to surround an outer surface of the ferrule, and a key extending from said frame along a longitudinal direction of the connector, said key being configured to mate with a corresponding keyway provided in the optical fiber adapter,
  wherein the front portion of the inner housing is releasably connected to the rear portion of the inner housing by means of a first coupling member associated to the front portion of the inner housing cooperating with a second coupling member associated to the rear portion of the inner housing according to a first orientation corresponding to a first polarity of the connector with respect to the adapter,
  the method comprising the steps of:
  a) pulling longitudinally the front portion of the inner housing until the first coupling member associated to the front portion of the inner housing disengages from the second coupling member associated to the rear portion of the inner housing, thereby detaching the front portion of the inner housing from the rear portion of the inner housing;
  b) rotating the front portion of the inner housing by 180° about the longitudinal direction with respect to the rear portion, thereby bringing the front portion in a second orientation corresponding to a second polarity of the connector with respect to the adapter; and c) pushing longitudinally the front portion of the inner housing towards the rear portion of the inner housing until the first coupling member associated to the front portion engages the second coupling member associated to the rear portion, thereby connecting the front portion to the rear portion according to said second orientation.

The polarity-change method according to the invention involves simple operations that may be carried out manually without the need of a specific tool.

Moreover, as stated above, the method of the invention only requires to displace a single component of the connector, namely the front portion of the inner housing, which can be handled in a simple manner due to the provision of the key-supporting frame, and which is easily accessible without the need to break the integrity of the connector and of the cable.

Throughout this description and in the following claims, the expression "optical fiber" is used to indicate an elongated optical element comprising an optical waveguide, constituted by an optically transmissive core, surrounded by a cladding. The optical waveguide may be covered by at least one protective coating layer. Two protective coating layers may be provided: a first coating layer (primary coating) is in direct contact with the optical waveguide, while a second coating layer (secondary coating) covers the primary coating. In addition, a buffer layer may cover the optical fiber. The buffer layer may be substantially in contact with the secondary coating (tight buffer) or it may consist of a small tube housing one or more optical fibers (loose buffer).

Throughout this description and in the following claims, the expressions "optical cable," "optical fiber cable" or similar are used to indicate one or more optical fibers, possibly surrounded by strengthening fibers, disposed within a cable jacket.

Throughout this description and in the following claims, the expression "key" is used to indicate a mechanical element protruding from an outer surface of a connector housing, and having a specific mechanical profile which can only be mated, in a particular orientation, with a corresponding keyway provided on the adapter in which the connector is to be received, so as to prevent the connector to be mated with the adapter in a different orientation.

Throughout this description and in the following claims, the expression "elastic deformation" and analogous expressions refer to the ability of a body to change its shape under a force and to return to its original shape when that force is removed.

Throughout this description and in the following claims, the expression "longitudinal direction" refers to a direction substantially coinciding with or substantially parallel to a direction along which the connector mainly extends.

Throughout this description and in the following claims, the terms "front," "forward," "rear," "rearward," "backward," and analogous terms, refer to the longitudinal direction going from the optical cable to the ferrule of the connector to which the optical cable is connected.

Throughout this description and in the following claims, the terms "upper" or "top" and "lower" or "bottom," and similar, are used merely for reference in connection with the orientation of the connector as shown in the attached drawings, and could alternatively be interchanged.

Throughout this description and in the following claims, the expression "lateral" and similar terms, are used merely for reference in connection with the orientation of the connector as shown in the attached drawings.

Similarly, throughout this description and in the following claims, also the expressions "horizontal," "vertical" and similar are used merely for reference in connection with the orientation of the connector as shown in the attached drawings.

Throughout this description and in the following claims, the terms "inner," "inwards," "outer," "outwards" and similar refer to a generically radial direction with respect to a longitudinal axis of the ferrule of the connector.

The present disclosure can be implemented according to one or more of the following embodiments, optionally combined together.

In embodiments, the key is configured as an elongated tab extending in cantilevered fashion from the frame of the front portion of the inner housing.

In embodiments, the key is configured as an elongated tab extending in cantilevered fashion backwards from the frame of the front portion of the inner housing.

In embodiments, said key is made of an elastically deformable material.

In this way, the key can partially bend without the risk of breaking during detachment and re-attachment of the front portion from/to the rear portion of the inner housing.

In embodiments, said first and second coupling members are complementary snap-fit members respectively provided on the key and on the rear portion of the inner housing.

In this way, coupling and decoupling between the front portion and the rear portion of the inner housing is quick and simple.

In embodiments, said removable coupling members include a rib protruding from the rear portion of the inner housing and a corresponding recess provided in a free end of the key.

In alternative embodiments, said removable coupling members may include a rib protruding from a free end of the key and a corresponding recess provided in the rear portion of the inner housing.

Still alternatively, said removable coupling members include mutually engaging ribs respectively protruding from the rear portion of the inner housing and from the free end of the key.

In embodiments, the front portion of the inner housing further comprises an alignment member protruding from the frame and configured to mate with a corresponding recess provided in the rear portion of the inner housing.

The provision of a further alignment feature helps correctly re-positioning the front portion with respect to the rear portion of the inner housing during the polarity change procedure.

In embodiments, the connector further comprises a cap configured to be removably arranged at the front portion of the inner housing, so as to cover an exposed portion of the ferrule.

When it is applied onto the connector, the cap advantageously protects the ferrule from dust, dirt and from possible damages.

In embodiments, the cap comprises a couple of flexible elements at opposite lateral walls of the cap.

In embodiments, said flexible elements are configured to removably engage the front portion of the inner housing when they are bent towards said front portion.

The provision of flexible elements on lateral walls of the cap advantageously allows the cap to be used as a tool for aiding the removal of the front portion of the inner housing and its re-attachment. Indeed, by acting on the flexible elements while grabbing the cap applied onto the connector, the cap engages the front portion of the inner housing, and the front portion of the inner-housing can be removed by pulling forward the cap engaging the front portion.

In embodiments, the cap comprises a couple of through slots formed in said opposite lateral walls thereof.

In embodiments, said flexible elements are flexible tabs integral with the cap and housed in cantilevered fashion in said through slots.

In this way, the flexible tabs can be bent inwards through the respective slot, so as to contact and engage the underlying front portion of the inner housing.

In embodiments, each flexible tab comprises a respective tooth at a free end thereof configured to abut against a rear edge of the frame of the front portion of the inner housing.

This feature of the cap advantageously allows to engage the front portion of the inner housing along the longitudinal direction. In this way, the front portion is securely hooked on two opposite lateral sides thereof, and can be moved forward by pulling the cap.

In embodiments, the rear portion of the inner housing comprises a plurality of pockets formed in opposite lateral walls thereof.

In embodiments, each pocket is configured to receive a respective tooth of said flexible tabs.

In embodiments, each of said pockets is flanking the rear edge of the frame of the front portion of the inner housing.

The provision of said pockets in the inner housing adjacent to the rear edge of the frame causes portions of said rear edge to be exposed, so that when the tooth of the flexible tabs of the cap is received in the respective recess, said tooth abuts on the rear edge and hook the front portion of the inner housing.

In this way, the cap may allow to easily detach the front portion of the inner housing by pulling the temporary assembly formed by the cap and said front portion.

In embodiments, the connector further comprises an outer housing arranged around the rear portion of the inner housing and configured to slide along the longitudinal direction of the connector between a forward locking position and a rearward releasing position of the front portion of the inner housing.

In this way, the outer housing prevents the first coupling member to be accidentally disengaged from the second coupling member, thereby locking the front portion of the inner housing to the rear portion of the inner housing, when it is in the forward locking position. Conversely, the outer housing allows the first coupling member to be disengaged from the second coupling member, thereby unlocking the front portion of the inner housing from the rear portion of the inner housing, when it is in the backward releasing position.

Thus, the outer housing acts as a locking member that prevents the front portion to be inadvertently detached from the rear portion of the inner housing, unless the outer housing is voluntarily slid in the backward releasing position.

In embodiments, the connector further comprises at least one biasing member configured to bias the outer housing towards the forward locking position.

In embodiments, the cap comprises a rear edge configured to abut against a front edge of the outer housing.

In this way, the cap can be used to cause the outer housing to slide in the backward releasing position during insertion of the cap onto the connector.

In embodiments, said connector is a Multi-fiber Push On (MPO) connector.

In embodiments, said step a) of pulling longitudinally the front portion of the inner housing further comprises:
a1) providing a cap configured to be removably arranged at the front portion of the inner housing of the connector, so as to cover an exposed portion of the ferrule, said cap comprising a couple of flexible elements at opposite lateral sides thereof, said flexible elements being configured to removably engage the front portion of the inner housing when they are bent towards said front portion,
a2) applying said cap onto the front portion of the inner housing of the connector;
a3) pressing the flexible elements of the cap towards the front portion of the inner housing, thereby temporary assembling the cap to the front portion of the inner housing; and
a4) pulling longitudinally the temporary assembly of cap and front portion of the inner housing until the first coupling member associated to the front portion of the inner housing disengages from the second coupling member associated to the rear portion of the inner housing, thereby detaching the front portion of the inner housing from the rear portion of the inner housing.

In this embodiment, the cap advantageously acts as a tool for detaching the front portion from the rear portion of the inner housing during the polarity change procedure, firmly holding the front portion without losing grip thereon.

In embodiments, said step b) of rotating the front portion of the inner housing by 180° about the longitudinal direction with respect to the rear portion of the inner housing comprises rotating the temporary assembly of cap and front portion.

In embodiments, said step c) of pushing longitudinally the front portion of the inner housing towards the rear portion of the inner housing comprises pushing longitudinally the temporary assembly of cap and front portion.

In this embodiment, the use of the cap advantageously simplifies the overall polarity change procedure, since the front portion temporary assembled to the cap is easier to hold and displace with respect to the front portion of the inner housing alone.

In embodiments, the method further comprises a step of:
a0) sliding the outer housing in the rearward releasing position, thereby unlocking the front portion of the inner housing from the rear portion of the inner housing.

In embodiments, the method further comprises a step of:
d) sliding the outer housing in the forward locking position, thereby locking the front portion of the inner housing to the rear portion of the inner housing.

In embodiments, said step a0) of sliding the outer housing in the rearward releasing position is carried out at the same time as step a2) of applying said cap onto the front portion of the inner housing of the connector.

During insertion of the cap on the connector, the rear edge of the cap abuts against the front edge of the outer housing. The cap can thus be used to cause the outer housing to slide in the backward releasing position by simply pushing the cap.

In embodiments, said step d) of sliding the outer housing in the forward locking position is carried out at the same time as removing said cap from the connector.

BRIEF DESCRIPTION OF THE SEVERAL VIEWS OF THE DRAWINGS

The present invention will be now described in more detail hereinafter with reference to the accompanying drawings, in which embodiments of the invention are shown. Drawings illustrating the embodiments are not to scale representations.

In the drawings.

DETAILED DESCRIPTION

With reference to FIGS. 1-6, an optical fiber connector 10 according to the present invention is now described.

The optical fiber connector 10 comprises a ferrule 12 having a generally planar front face 14, on which a plurality of terminations 16 of optical fibers are exposed, and an outer surface 18.

The optical fibers 16 are conveyed to the connector 10 by an optical cable 1, that may be provided with a cable booth 2 at a connection region with the connector 10.

As in most multi-fiber optical connectors, the ferrule 12 is generically conformed as a parallelepiped.

By way of example, in all the embodiments described herein and shown in the attached drawings, the connector 10 is of the female type, and accordingly the ferrule 12 includes a couple of holes 20, 22 formed at the front face 14 thereof, said holes 20, 22 being configured for receiving pins carried by a complementary male adapter (not illustrated) to which the connector 10 is to be mated in use.

In alternative embodiments, the connector 10 may be of the male type, and the holes 20, 22 illustrated in the attached drawings may accordingly be replaced by pins.

The connector 10 comprises an inner housing 24, sleeved onto the ferrule 12 and surrounding the outer surface 18 thereof. The inner housing 24 is arranged around the ferrule 12 so as to leave a front exposed portion thereof available for connection with the adapter.

The inner housing 24 is configured as an elongated hollow body comprising an upper wall 26 and a lower wall 28, connected by lateral walls 27, 29.

Figure 2:
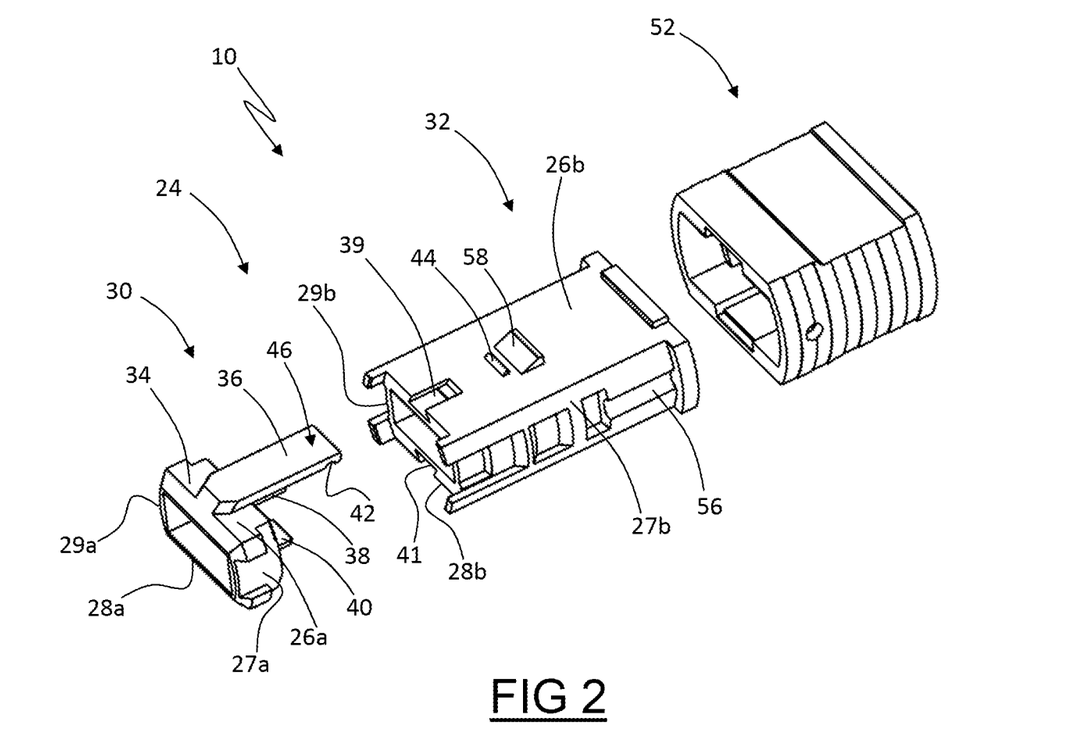
FIG. 2 is an exploded view of the connector of FIG. 1.

According to the invention and as best seen in the exploded view of FIG. 2, the inner housing 24 comprises a front portion 30 and a rear portion 32 connected to each other in a releasable manner.

Figure 3:
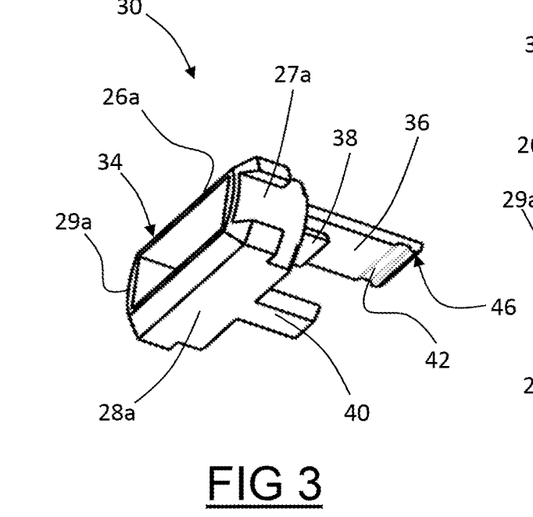
FIGS. 3 and 4 are enlarged schematic perspective views of a component of the connector of FIG. 1.
Figure 4:
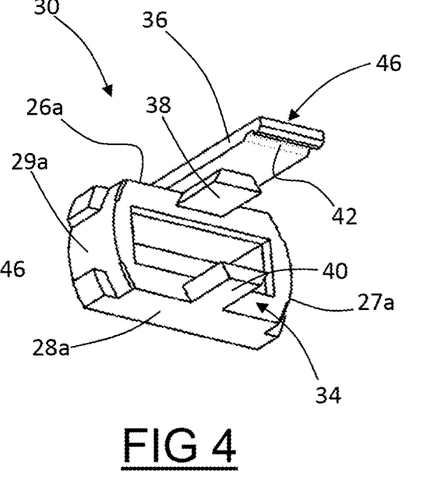

The front portion 30 of the inner housing 24, which is further illustrated in the enlarged perspective views in FIGS. 3 and 4, comprises a frame 34 configured as a hollow sleeve configured to be arranged around the ferrule 12.

The frame 34 comprises an upper wall 26a and a lower wall 28a connected by lateral walls 27a, 29a, which are front portions of said upper wall 26, said lower wall 28 and said lateral walls 27, 29 of the inner housing 24, respectively.

The front portion 30 further comprises a key 36 integral with the frame 34 and extending in a cantilevered fashion therefrom.

In particular, the key 36 is configured as an elongated flat tab extending backwards, in a cantilevered-fashion, from the upper wall 26a of the frame 34. The key 36 is shaped so as to fit into a complementary keying slot or keyway provided on the optical fiber adapter (not shown) to which the connector 10 is to be mated in use.

In the assembled condition of the connector 10 (shown in FIG. 1), the key 36 protrudes outwards from the inner housing 24 in order to provide for a predetermined mating alignment of the connector 10 with the complementary adapter based on the position of the keyway. Indeed, except for the provision of the key 36, the inner housing 24 is symmetrical with respect to a horizontal median plane M of the connector 10 (schematically indicated in FIG. 1).

Figure 1:
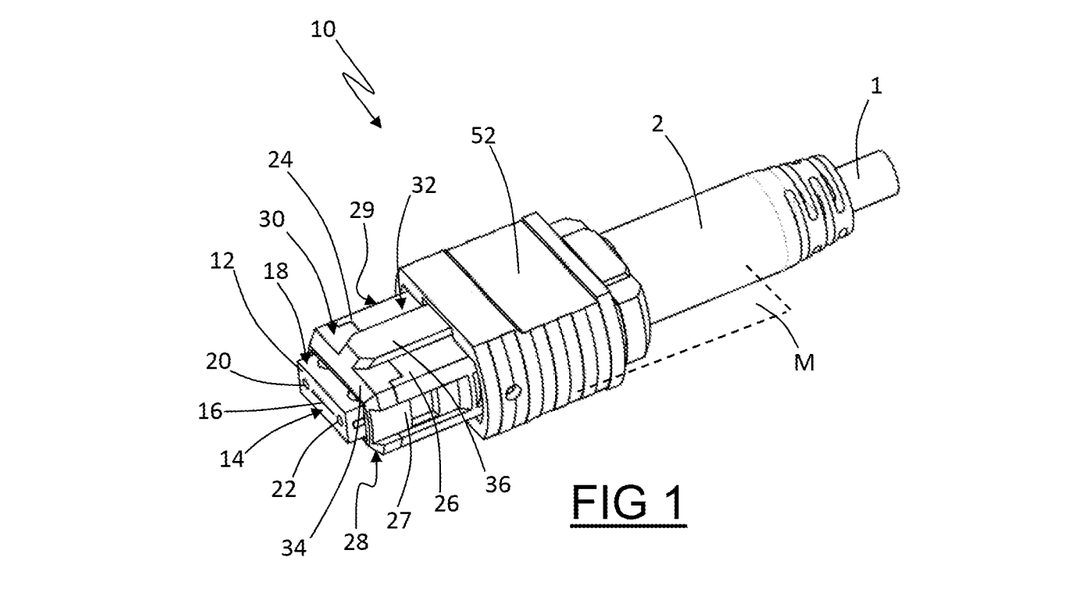
FIG. 1 is a schematic perspective view of an optical cable connector according to the present invention, in an assembled configuration.
Figure 5:
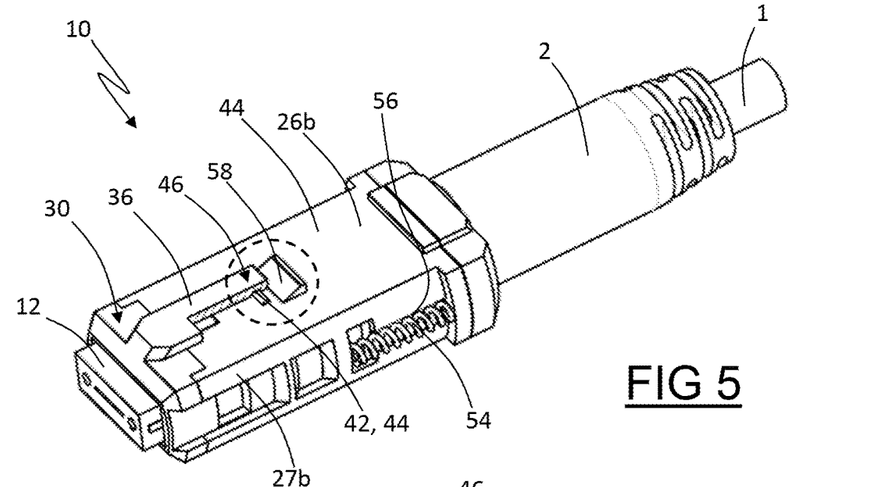
FIG. 5 is a schematic perspective view of the connector of FIG. 1, with some of its components removed and/or with partially cutaway portions.

In FIGS. 1, 2 and 5, the key 36 is in particular positioned according to a first orientation, corresponding to a first polarity of the connector 10 with respect to the mating adapter.

The front portion 30 of the inner housing 24 may be further provided with one or more alignment members configured to mate with corresponding recesses provided on the rear portion 32 of the inner housing 24.

For example, said alignment members (better visible in FIGS. 3-4) may be in the form upper and lower tabs 38, 40 symmetrically arranged at the upper wall 26a and at the lower wall 28a, respectively. In particular, the upper tab 38 is adjacent to the key 36. Said upper or lower tabs 38, 40 are for example received, in the assembled condition of the connector 10, in recesses 39, 41 on the rear portion 32 of the inner housing, illustrated in FIG. 2

The rear portion 32 comprises an upper wall 26b and a lower wall 28b, connected by lateral walls 27b, 29b, these walls being the rear portions of said upper wall 26, said lower wall 28 and said lateral walls 27, 29 of the inner housing 24, respectively.

The front portion 30 and the rear portion 32 are connected in a removable manner by means of mutually engaging coupling members, comprising a first coupling member 42 provided on the key 36, and a complementary second coupling member 44 provided on the rear portion 32 of the inner housing 24.

By way of example, said first and second coupling members 42, 44 are of the snap-fit type, and thus allow an easy and quick engagement and disengagement during the detachments and re-attachment of the front portion 30 from/to the rear portion 32 of the inner housing 24.

As can be best seen in FIGS. 5-6, the first coupling member 42 is a recess, still denoted by reference 42 in the following description, formed at a free end 46 of the key 36. The second coupling member 44 is a rib, still denoted by reference 44 in the following description, protruding from the upper wall 26b of the rear portion 32.

Both the recess 42 on the free end 46 of the key 36 and the rib 44 extend along a horizontal direction perpendicular to the longitudinal direction.

In order to provide for a releasable engagement between said first and second coupling members 42, 44, the key 36 is made of an elastically deformable material, and both the rib 44 and the free end 46 of the key 36, at said recess 42, comprise respective inclined profiles 48, 50 that facilitate the deflection of the key 36 when the front portion 30 of the inner housing 24 is pushed towards or pulled away from the rear portion 32 of the inner housing 24.

As the key 36 is supported by, and in embodiments integral with, the detachable front portion 30 of the inner housing 24, it may be moved from the first orientation of FIGS. 1, 2 and 5, corresponding to a first polarity of the connector 10, to a second orientation corresponding to a second, opposed polarity of the connector 10.

The advantageous structural configuration of the connector 10 allows to change the polarity thereof by means of a simple and fast procedure that may be carried out manually, without the need of a specific tool.

In embodiments, the polarity change procedure may include the following steps:

pulling longitudinally the front portion 30 of the inner housing 24 until disengagement between the recess 42 on the free end 46 of the key 36 and the rib 44 extending from the upper wall 26b of the rear portion 32 of the inner housing 24, so as to detach the front portion 30 from the rear portion 32; the front portion 30 can be easily pulled by holding the frame 34, for example by pressing two fingers onto the opposing lateral walls 27a, 29a or alternatively onto the opposing upper and lower walls 26a, 28a thereof;

rotating the front portion 30 of the inner housing 24 by 180° about the longitudinal direction; in this way, the key 36 is brought in the second orientation in which it faces the lower wall 28b of the rear portion 32 of the inner housing 24; and pushing longitudinally the front portion 30 towards the rear portion 32 of the inner housing 24 until engagement between the recess 42 on the free end 46 of the key 36 and the rib 44 extending from the lower wall 28b of the rear portion 32 of the inner housing 24, thereby connecting again the front and rear portions 30, 32 according to the second orientation of the key 36.

In embodiments, the connector 10 further comprises an outer housing 52 supported onto the inner housing 24, in particular onto the rear portion 32 thereof.

The outer housing 52 is sleeved onto the inner housing 24 in a slidable manner between a forward position and a backward position.

When the outer housing 52 is in the forward position, it covers the free end 46 of the key 36 (see FIG. 1) so that any possible deflection of the key 36 in an outwards direction is prevented. In this way, the disengagement of the first and second coupling members 42, 44 is prevented, and the front portion 30 is securely locked to the rear portion 32 of the inner housing 24. The forward position thus corresponds to a forward locking position of the front and rear portions 30, 32 of the inner housing 24.

When the outer housing 52 is in the backward position, the free end 46 of the key 36 is uncovered so that the key 36 is free to bend away from the upper wall 26b of the rear portion 32 of the inner housing 24, and the first and second coupling members 42, 44 may be disengaged by pulling longitudinally the front portion 30 of the inner housing 24. In this way, the front portion 30 of the inner housing 24 is free to be unlocked from the rear portion 32 of the inner housing 24. The rearward position of the outer housing 52 thus corresponds to a rearward releasing position of the front portion 30 with respect to the rear portion 32 of the inner housing 24.

The outer housing 52 is biased towards the forward locking position by means of a biasing member. In embodiments, this biasing member comprises a couple of springs 54 (one is shown in FIG. 5, in which the connector 10 is illustrated with the outer housing removed) housed in grooves 56 formed in the lateral walls 27b, 29b of the rear portion 32 of the inner housing 24.

Figure 6:
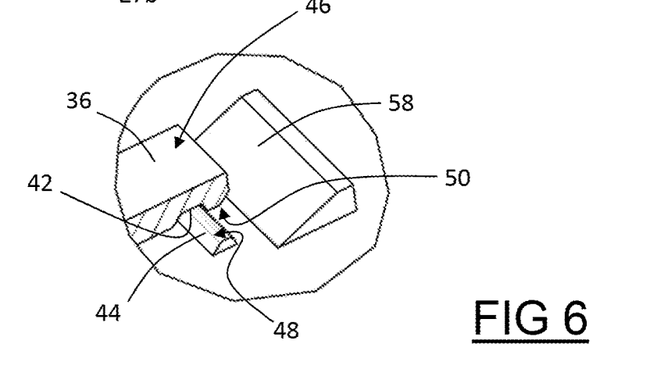
FIG. 6 is an enlarged schematic view of a detail of the connector encircled by a dotted line in FIG. 5.

The inner housing 24 may be further provided with a stop element 58, exemplarily illustrated in FIG. 5 and in the detail of FIG. 6, configured to stop the sliding stroke of the outer housing 52 in the forward direction.

When the outer housing 52 is provided, the manual method to change the polarity of the connector 10, outlined above, further includes an initial step of unlocking the front portion 30 of the inner housing 24 from the rear portion 32, carried out by simply sliding the outer housing 52 in the rearward releasing position. Once the front and rear portions 30, 32 of the inner housing 24 have been reattached according to the second orientation of the key 36, the outer housing 52 is biased back in the forward locking position by the biasing member.

In this embodiment, the polarity change procedure may be manually carried out using two hands: one for holding the rear portion 32 and at the same time sliding rearwards the outer housing 52, and the other one for grabbing the front portion 30 of the inner housing 24.

Figure 7:
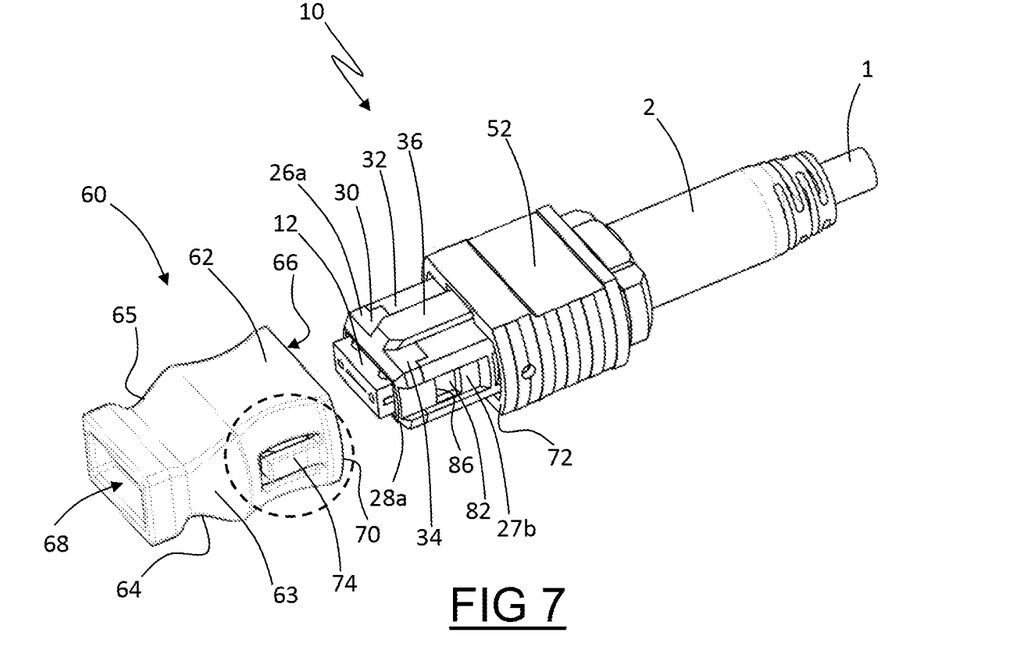
FIG. 7 is a schematic perspective view illustrating the connector of FIG. 1 and a cap thereof.
Figure 8:
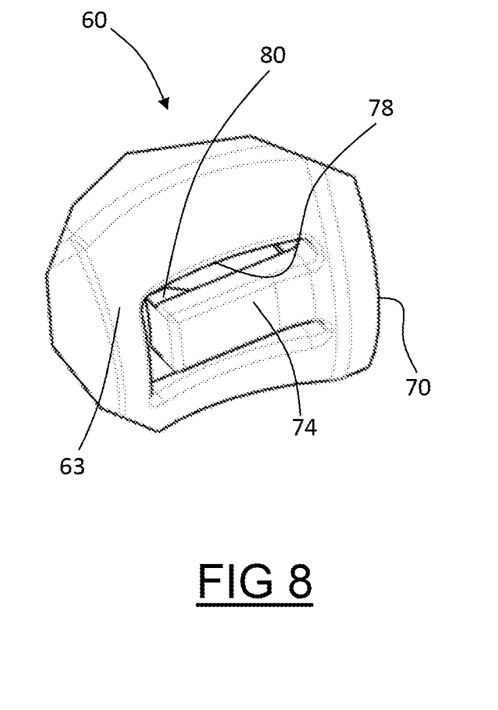
FIG. 8 is an enlarged schematic view of a detail of the cap encircled by a dotted line in FIG. 7.
Figure 9:
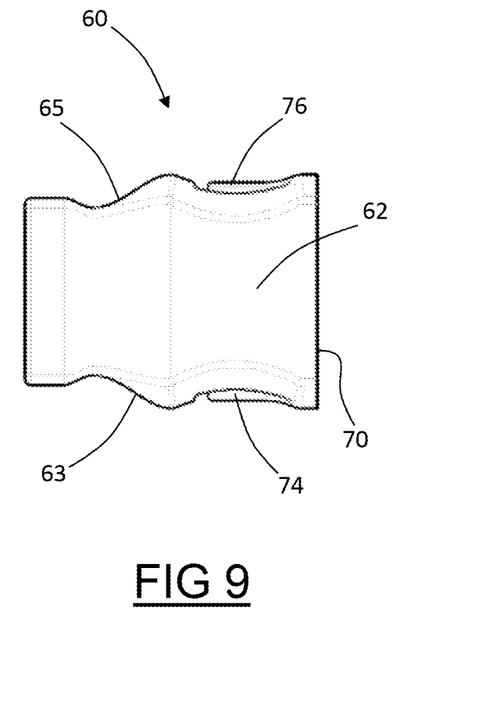
FIG. 9 is a schematic top view of the cap illustrated in FIG. 7.

In the embodiment illustrated in FIGS. 7-9, the connector 10 further comprises a cap 60.

The cap 60 is configured to be applied on the connector 10 at the front portion 30 of the inner housing 24, so as to cover the exposed portion of the ferrule 12. In this way, it is possible to protect the ferrule 12 from dust, dirt and from possible mechanical damages when the connector is disconnected from the adapter, for example before installation of the optical cable or during maintenance thereof.

The cap 60 is configured as a hollow body comprising upper and lower walls 62, 64 and opposite lateral walls 63, 65. The cap 60 comprises a rear aperture 66 for receiving the connector 10.

The cap 60 may also comprise a front aperture 68 that allows to see the light emitted by the terminations 16 of optical fibers exposed on the front face 14 of the ferrule 12 when the optical cable 1 is connected to a light source on an opposite side thereof with respect to the connector 10.

For similar purposes, in alternative embodiments (not shown) the cap 60 may comprise a front translucent wall, or it may be totally translucent.

As shown in FIG. 7, the cap 60 comprises a rear edge 70 configured to abut against a front edge 72 of the outer housing 52, when provided for, in an embodiment of the method for changing the polarity of the connector 10 described hereinafter with reference to FIGS. 10-15.

The cap 60 advantageously comprises a couple of flexible elements, in particular configured as flexible tabs 74, 76, integral with the cap 60 and extending in cantilevered-fashion from the opposite lateral walls 63, 65 thereof.

More in detail and as visible in FIG. 8, the cap 60 comprises a couple of through slots 78 (only one on one side is visible and numbered in the various figures) formed in said opposite lateral walls 63, 65. The flexible tabs 74, 76 are housed in said through slots 78 and are cantilevered from respective edges of said slots 78.

Each flexible tab 74, 76 carries a respective tooth 80 (visible in FIG. 8) at a free end thereof.

The inner housing 24, and in particular the rear portion 32 thereof, comprises a couple of pockets 82 (only one is visible in FIG. 7), formed in the lateral walls 27b, 29b thereof. The pockets 82 are sized and positioned to receive the teeth 80 when the flexible tabs 74, 76 are bent inwards and brought closer to the inner housing 24.

The pockets 82 are adjacent to the frame 34 of the front portion 30, and are in particular flanking a rear edge 86 (indicated in FIG. 7) of said frame 34, which is exposed at said pockets 82.

In a rest position of the cap 60, as shown in FIG. 9, the flexible tabs 74, 76 slightly protrude outwards from the cap 60 or are flush with the same.

The flexible tabs 74, 76 may be bent inwardly until each tooth 80 is received in the respective pocket 82 in the inner housing 24.

When the teeth 80 are in pockets 82 in the inner housing 24, the teeth 80 abut against the rear edge 86 of the frame 34 of the front portion 30 of the inner housing 24, thereby hooking said front portion 30 for an easy movement thereof in a forward direction.

In this way, the cap 60 may advantageously be used as a tool for firmly engaging and holding the front portion 30 of the inner housing 24 without the need of grabbing it by hand, easing when required the manual procedure for changing the polarity of the connector 10.

With reference to FIGS. 10-15, an embodiment of a method for changing the polarity of the connector 10, comprising said cap 60, is described. In these figures, solid arrows schematically indicate the movements of the cap 60 with respect to the connector 10, whereas dotted arrows schematically indicate directions along which forces are applied onto the flexible tabs 74, 76 of the cap 60.

Figure 10:
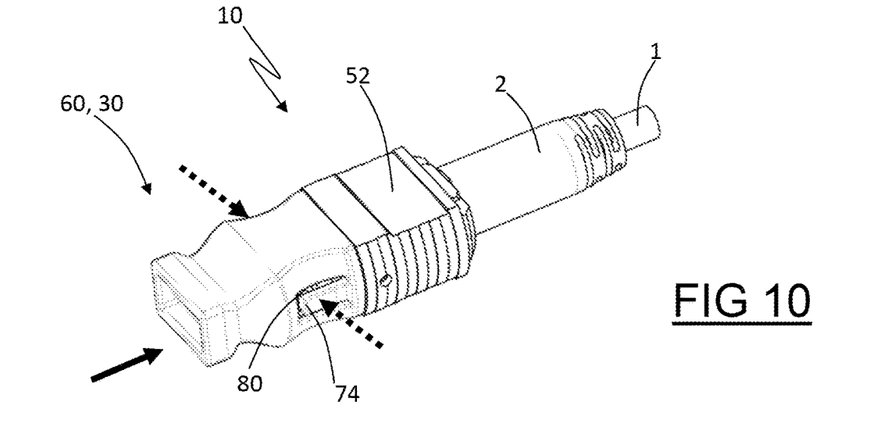
FIGS. 10-11 and 13-15 are schematic perspective views illustrating the connector of FIG. 7 during steps of a method for changing the polarity thereof.

As shown in FIG. 10, the cap 60 is first applied onto the front portion 30 of the inner housing 24 (visible in FIG. 7) of the connector 10.

During insertion of the cap 60, the rear edge 70 thereof abuts against the front edge 72 of the outer housing 52 (edges 70, 72 visible in FIG. 7) and causes the outer housing 52 to slide in the rearward releasing position. In this way, the unlocking of the first portion 30 from the rear portion 32 is advantageously obtained automatically by simply applying the cap 60 onto the connector 10.

After the cap 60 is inserted on the connector 10, the flexible tabs 74 are bent inwardly so that the teeth 80 abut against the rear edge 82 of the frame 34 and hook the front portion 30, thereby temporary assembling the cap 60 to the front portion 30 of the inner housing 24.

Figure 11:
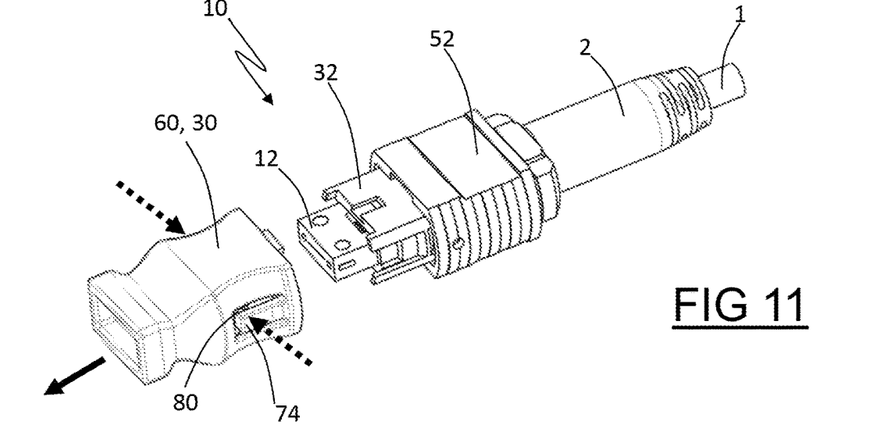

Still pressing onto the free ends of flexible tabs 74, 76, the temporary assembly of cap 60 and front portion 30 of the inner housing 24 is pulled longitudinally until disengagement between the first and second coupling means 40, 42 respectively provided on the key 36 and on the rear portion 32 of the inner housing 24, thereby detaching the front portion 30 from the rear portion 32 (FIG. 11).

Figure 12:
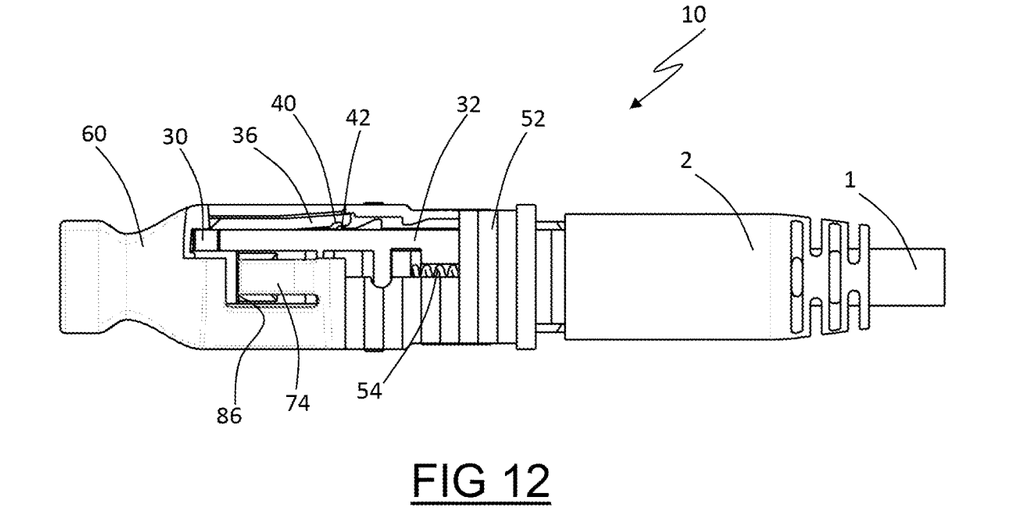
FIG. 12 is a schematic lateral view of the connector of FIG. 7, with some parts removed, during steps of the method for changing the polarity thereof.

FIG. 12 schematically illustrates the connector 10, with some parts removed to show the internal components thereof, during the step of pulling longitudinally the temporary assembly of cap 60 and front portion 30 of the inner housing 24 away from the rear portion 32 of the inner housing 24.

In the instantaneous condition shown herein, the tooth 80 (here hidden) of the flexible tab 74 of the cap 60 is in abutment onto the rear edge 86 of the frame 34 of the front portion 30 of the inner housing 24 and is thus moving forward said front portion 30; the key 36 is deflected upwards during the disengagement of the first and second coupling means 42, 44; and the outer housing is being biased towards the forward locking position by the springs 54.

Figure 13:
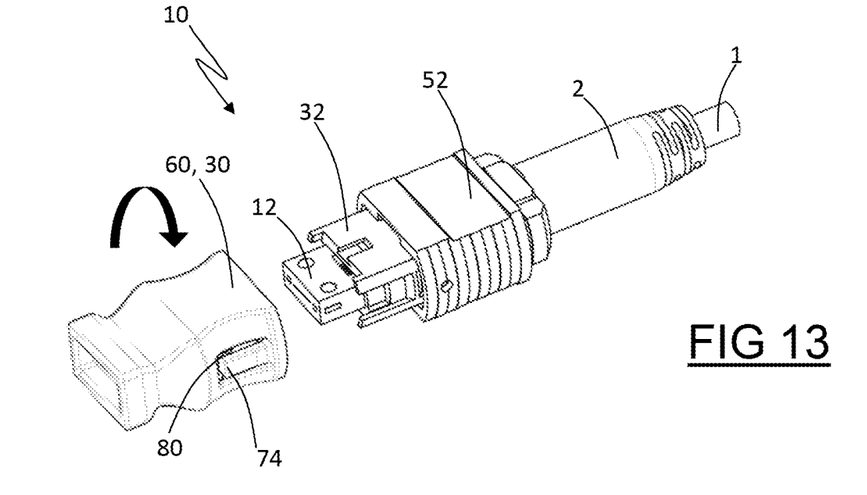

Thereafter, the temporary assembly of cap 60 and front portion 30 of the inner housing 24 is rotated by 180° about the longitudinal direction, thereby bringing the key 36 in the second orientation associated with the second polarity (FIG. 13).

Figure 14:
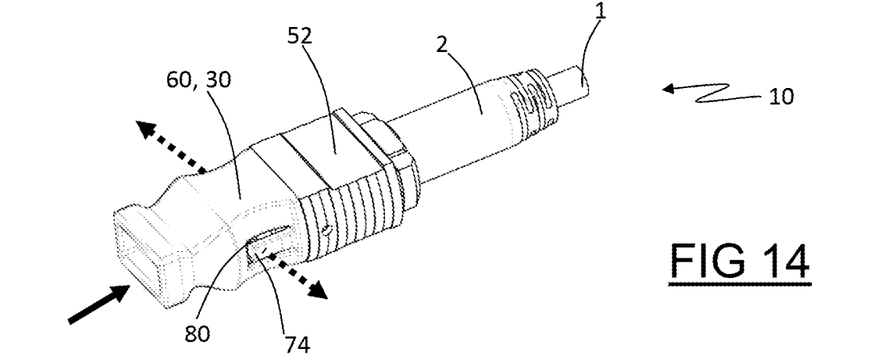

The temporary assembly of cap 60 and front portion 30 of the inner housing 24 is thus pushed longitudinally towards the rear portion 32 of the inner housing 24, until engagement between the recess 42 on the free end 46 of the key 36 and the rib 44 extending from the lower wall 28b of on the rear portion 32 of the inner housing 24, thereby connecting again the front and rear portions 30, 32 according to the second orientation of the key 36 (FIG. 14). At the same time, the outer housing 52 is pushed again by the cap 60 in its backward releasing position.

When the flexible tabs 74, 76 are lastly released, they return in their rest position and disengage the cap 60 from the front portion 30 of the inner housing 24.

Figure 15:
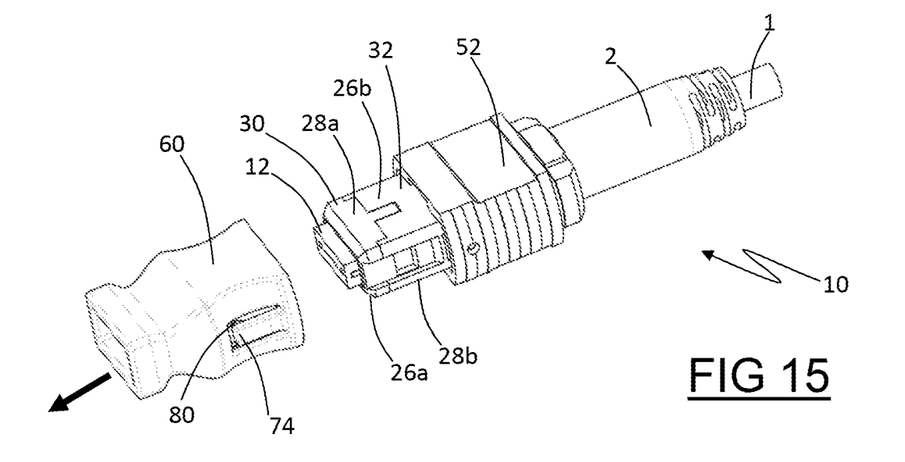

The cap 60 may be then removed from the connector 10 (FIG. 15). During removal of the cap 60, the outer housing 52 is biased back in the forward locking position by the springs 54.

It is noted that in FIG. 15, the key 36 is not visible as it is positioned along the lower wall 28b of rear portion 32 of the inner housing 24, according to the second orientation thereof associated with the second polarity of the connector 10.

A person skilled in the art will easily understand that in the polarity-change methods described above, instead of turning by 180° the front portion 30 with respect to rear portion 32 of the inner housing 24 (as schematically illustrated in FIGS. 13-15), it would be equivalent to turn by 180° the rear portion 32 of the inner housing 24, along with the attached optical cable 1, with respect to the front portion 30 of the inner housing 24.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An optical fiber connector, comprising:
a ferrule, housing a plurality of terminations of optical fibers, and
an inner housing arranged around the ferrule and comprising a rear portion and a front portion configured to be inserted into an optical fiber adapter,
wherein the front portion of the inner housing is releasably connected to the rear portion of the inner housing and comprises a frame, configured to surround an outer surface of the ferrule, and a key extending from said frame along a longitudinal direction of the connector, said key being configured to mate with a corresponding keyway provided in the optical fiber adapter, and wherein the front portion of the inner housing is releasably connected to the rear portion of the inner housing by means of a first coupling member associated to the front portion of the inner housing cooperating with a second coupling member associated to the rear portion of the inner housing, in either one of:
- a first orientation in which the key extends along an upper wall of the inner housing, said first orientation corresponding to a first polarity of the connector with respect to the adapter, and
- a second orientation in which the key extends along a lower wall of the inner housing, said second orientation corresponding to a second polarity of the connector with respect to the adapter.

2. The connector according to claim 1, wherein the key is configured as an elongated tab cantilevered from the frame of the front portion of the inner housing.

3. The connector according to claim 1, wherein the key is configured as an elongated tab extending in cantilevered fashion backwards from the frame of the front portion of the inner housing.

4. The connector according to claim 1, wherein said key is made of an elastically deformable material, and wherein said first and second coupling members are complementary snap-fit members respectively provided on the key and on the rear portion of the inner housing.

5. The connector according to claim 4, wherein said first and second coupling members include a rib protruding from the rear portion of the inner housing and a corresponding recess provided on a free end of the key.

6. The connector according to claim 1, wherein the front portion of the inner housing further comprises an alignment member protruding from the frame and configured to mate with a corresponding recess provided in the rear portion of the inner housing.

7. The connector according to claim 1, further comprising a cap configured to be removably arranged at the front portion of the inner housing, so as to cover an exposed portion of the ferrule.

8. The connector according to claim 7, wherein the cap comprises a couple of flexible elements at opposite lateral walls thereof, said flexible elements being configured to removably engage the front portion of the inner housing.

9. The connector according to claim 8, wherein the cap comprises a couple of through slots formed in said opposite lateral walls thereof and wherein said flexible elements are configured as flexible tabs integral with the cap and housed in cantilevered fashion in said through slots, each flexible tab comprising a respective tooth at a free end thereof, configured to engage a rear edge of the frame of the front portion of the inner housing.

10. The connector according to claim 9, wherein the rear portion of the inner housing comprises a plurality of pockets formed in opposite lateral walls thereof, each pocket being configured to house a respective tooth of said flexible elements.

11. The connector according to claim 10, wherein each of said pockets is flanking the rear edge of the frame of the front portion of the inner housing.

12. The connector according to claim 1, further comprising an outer housing arranged around the rear portion of the inner housing and configured to slide along the longitudinal direction of the connector between a forward locking position and a rearward releasing position of the front portion of the inner housing.

13. A method for changing polarity of an optical fiber connector, wherein said connector includes a ferrule, housing a plurality of terminations of optical fibers, and an inner housing arranged around the ferrule and including a rear portion and a front portion configured to be inserted into an optical fiber adapter,
wherein the front portion of the inner housing is releasably connected to the rear portion of the inner housing and includes a frame configured to surround an outer surface of the ferrule, and a key extending from said frame along a longitudinal direction of the connector, said key being configured to mate with a corresponding keyway provided in the optical fiber adapter,
wherein the front portion of the inner housing is releasably connected to the rear portion of the inner housing by means of a first coupling member associated to the front portion of the inner housing cooperating with a second coupling member associated to the rear portion of the inner housing according to a first orientation corresponding to a first polarity of the connector with respect to the adapter,
the method comprising acts of:
a) pulling longitudinally the front portion of the inner housing until the first coupling member associated to the front portion of the inner housing disengages from the second coupling member associated to the rear portion of the inner housing, thereby detaching the front portion of the inner housing from the rear portion of the inner housing;
b) rotating the front portion of the inner housing by 180° about the longitudinal direction with respect to the rear portion, thereby bringing the front portion in a second orientation corresponding to a second polarity of the connector with respect to the adapter; and
c) pushing longitudinally the front portion of the inner housing towards the rear portion of the inner housing until the first coupling member associated to the front portion engages the second coupling member associated to the rear portion, thereby connecting the front portion to the rear portion according to said second orientation.

14. The method according to claim 13, wherein said act a) of pulling longitudinally the front portion of the inner housing further comprises:
a1) providing a cap configured to be removably arranged at the front portion of the inner housing of the connector, so as to cover an exposed portion of the ferrule, said cap comprising a couple of flexible elements at opposite lateral sides thereof, said flexible elements being configured to removably engage the front portion of the inner housing,
a2) applying said cap onto the front portion of the inner housing of the connector;
a3) pressing the flexible elements of the cap towards the front portion of the inner housing, thereby temporarily assembling the cap to the front portion of the inner housing; and
a4) pulling longitudinally the temporary assembly of cap and front portion of the inner housing until the first coupling member associated to the front portion of the inner housing disengages from the second coupling member associated to the rear portion of the inner housing, thereby detaching the front portion of the inner housing from the rear portion of the inner housing.

15. The method according to claim 13, wherein said act b) of rotating the front portion of the inner housing by 180° about the longitudinal direction with respect to the rear portion of the inner housing comprises rotating the temporary assembly of cap and front portion, and wherein said act c) of pushing longitudinally the front portion of the inner housing towards the rear portion of the inner housing comprises pushing longitudinally the temporary assembly of cap and front portion.

16. The method according to claim 13, wherein said connector further comprises an outer housing arranged around the rear portion of the inner housing and configured to slide along the longitudinal direction of the connector between a forward locking position and a rearward releasing position of the front portion of the inner housing, and wherein the method further comprises an act of:

sliding the outer housing in the rearward releasing position, thereby unlocking the front portion of the inner housing from the rear portion of the inner housing.

17. The method according to claim 16, further comprising an act of:

d) sliding the outer housing in the forward locking position, thereby locking the front portion of the inner housing to the rear portion of the inner housing.

18. The method according to claim 14, wherein said connector further comprises an outer housing arranged around the rear portion of the inner housing and configured to slide along the longitudinal direction of the connector between a forward locking position and a rearward releasing position of the front portion of the inner housing, wherein the cap comprises a rear edge configured to abut against a front edge of the outer housing, and wherein the method further comprises an act of:

sliding the outer housing in the rearward releasing position, thereby unlocking the front portion of the inner housing from the rear portion of the inner housing, wherein said act of sliding the outer housing in the rearward releasing position is carried out at the same time as a2) applying said cap onto the front portion of the inner housing of the connector.

19. The connector according to claim 1, wherein the front portion of the inner housing is detachable from the rear portion of the inner housing.

20. The connector according to claim 1, wherein the front portion encompasses a frontal surface of the rear portion and wherein the front portion of the inner housing comprises an alignment member, in the form of a lower tab, configured to mate with a corresponding recess provided on the rear portion of the inner housing substantially simultaneously as said first coupling member of the front portion cooperates with said second coupling member associated to the rear portion.

* * * * *